US012291485B2

(12) United States Patent
Niessner et al.

(10) Patent No.: US 12,291,485 B2
(45) Date of Patent: May 6, 2025

(54) GYPSUM CEMENT COMPOSITIONS WITH AGGREGATE STABILIZERS AND METHODS FOR FORMING FLOOR UNDERLAYMENT

(71) Applicant: United States Gypsum Company, Chicago, IL (US)

(72) Inventors: Karl Glenn Niessner, Mundelein, IL (US); Dennis Mark Lettkeman, Broken Arrow, OK (US); John Wesley Wilson, Fairview, OK (US); William Kelly Bedwell, Okeene, OK (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 333 days.

(21) Appl. No.: 17/844,403

(22) Filed: Jun. 20, 2022

(65) Prior Publication Data

US 2023/0110018 A1    Apr. 13, 2023

Related U.S. Application Data

(60) Provisional application No. 63/246,017, filed on Sep. 20, 2021.

(51) Int. Cl.
*C04B 28/14* (2006.01)
*C04B 14/06* (2006.01)
(Continued)

(52) U.S. Cl.
CPC .............. *C04B 28/14* (2013.01); *C04B 14/06* (2013.01); *C04B 24/14* (2013.01); *C04B 24/2641* (2013.01); *C04B 24/2652* (2013.01); *C04B 24/38* (2013.01); *C04B 40/0042* (2013.01); *C04B 40/0608* (2013.01);
(Continued)

(58) Field of Classification Search
CPC ......... C04B 28/14; C04B 14/06; C04B 24/14; C04B 24/2641; C04B 24/2652; C04B 24/38; C04B 40/0042; C04B 40/0608
See application file for complete search history.

(56) References Cited

U.S. PATENT DOCUMENTS

| 2,956,884 A | 10/1960 | Caldwell |
| 3,573,947 A | 4/1971 | Kinkade |

(Continued)

FOREIGN PATENT DOCUMENTS

| EP | 2 808 312 A1 | 12/2014 |
| JP | 1045457 A | 2/1998 |

(Continued)

OTHER PUBLICATIONS

English machine translation of JP 2007-534607. (Year: 2007).*

(Continued)

*Primary Examiner* — John E Uselding
(74) *Attorney, Agent, or Firm* — Greer, Burns & Crain, Ltd; Philip T. Petti; Pradip Sahu

(57) ABSTRACT

This disclosure provides gypsum cement compositions which comprise an aggregate stabilizing mixture containing a combination of a polysaccharide gum and a polyacrylamide-gelatin blend, and methods for making and using these compositions, including pourable/pumpable floor underlayment slurries and methods for forming high strength underlayment on different substrates.

19 Claims, 5 Drawing Sheets

(51) Int. Cl.
  *C04B 24/14* (2006.01)
  *C04B 24/26* (2006.01)
  *C04B 24/38* (2006.01)
  *C04B 40/00* (2006.01)
  *C04B 40/06* (2006.01)
  C04B 103/12 (2006.01)
  C04B 103/22 (2006.01)
  C04B 103/40 (2006.01)
  C04B 103/50 (2006.01)
  C04B 111/00 (2006.01)
  C04B 111/60 (2006.01)

(52) U.S. Cl.
  CPC ...... *C04B 2103/12* (2013.01); *C04B 2103/22* (2013.01); *C04B 2103/408* (2013.01); *C04B 2103/50* (2013.01); *C04B 2111/00146* (2013.01); *C04B 2111/60* (2013.01)

(56) References Cited

U.S. PATENT DOCUMENTS

| | | |
|---|---|---|
| 5,004,506 A | 4/1991 | Allen |
| 5,175,278 A | 12/1992 | Peik |
| 6,110,271 A | 8/2000 | Skaggs |
| 6,777,517 B1 | 8/2004 | Albrecht |
| 7,056,964 B2 | 6/2006 | Lettkeman |
| 7,504,165 B2 | 3/2009 | Lettkeman |
| 7,754,007 B2 | 7/2010 | Lettkeman |
| 8,088,218 B2 | 1/2012 | Blackburn |
| 8,343,273 B1 | 1/2013 | Lettkeman |
| 8,545,620 B2 | 10/2013 | Frenkenberger |
| 9,321,681 B2 | 4/2016 | Dubey |
| 9,624,131 B1 | 4/2017 | Dubey |
| 9,708,220 B2 | 7/2017 | Lettkeman |
| 9,944,556 B2 | 4/2018 | Lettkeman |
| 9,950,954 B2 | 4/2018 | Mikaelsson |
| 9,975,808 B2 | 5/2018 | Lettkeman |
| 10,112,870 B2 | 10/2018 | White |
| 10,655,342 B2 | 5/2020 | Giles |
| 10,723,656 B2 | 7/2020 | Gaedt |
| 10,737,981 B2 | 8/2020 | Emami et al. |
| 10,815,152 B2 | 10/2020 | Dengler |
| 10,815,157 B2 | 10/2020 | Sharmak |
| 2008/0057206 A1 | 3/2008 | Igo |
| 2016/0340251 A1 | 11/2016 | Lettkeman et al. |
| 2020/0231503 A1 | 7/2020 | Dubey |

FOREIGN PATENT DOCUMENTS

| | | | |
|---|---|---|---|
| JP | 2007534607 A5 * | 6/2008 | ............ C04B 28/02 |
| JP | 2009184867 A | 8/2009 | |
| WO | WO2019/081548 A1 | 5/2019 | |
| WO | 2020074346 A1 | 4/2020 | |
| WO | 2020074348 A1 | 4/2020 | |

OTHER PUBLICATIONS

Stefanko, D., et al., "Blended calcium aluminate- calcium sulfate cement-based grout for p. reactor vessel in-situ decommissioning" Savannah River National Laboratory Savannah River Nuclear Solutions, LLC, Mar. 10, 2011, pp. 1-50.

Marchon, D., et al., "Hydration and rheology control of concrete for digital fabrication: Potential admixtures and cement chemistry", Cement and Concrete Research, May 26, 2018, pp. 96-110, vol. 112.

International Search Report dated Jan. 23, 2023 for PCT Application No. PCT/US2022/076483.

* cited by examiner

GYPSUM CEMENT COMPOSITIONS WITH AGGREGATE STABILIZERS AND METHODS FOR FORMING FLOOR UNDERLAYMENT

CROSS-REFERENCE TO RELATED APPLICATIONS

This application claims the benefit of priority to U.S. provisional patent application 63/246,017, filed Sep. 20, 2021, the entire disclosure of which is herein incorporated by reference.

TECHNICAL FIELD

This disclosure relates to gypsum cement compositions comprising an aggregate stabilizing mixture and methods for making and using these compositions, including pourable/pumpable floor underlayment slurries and methods for forming high strength underlayment on different substrates.

BACKGROUND

Gypsum and cement are widely used in various building applications, including in pourable/pumpable floor slurries. These slurries are typically mixed with sand and other aggregates. One of the technical challenges with pourable floor slurries that comprise sand is keeping the floor slurry homogenous and preventing sedimentation and separation of sand from the slurry during pumping and when the floor is setting.

When a poured floor is setting, it can be advantageous to have a thin film of water on the surface of the setting slurry. However, in mixtures with sand, it may be difficult to achieve a proper surface water balance if sand or other aggregates in the slurry separate from the suspension and sink to the bottom of the mixture. Water can also come out of the suspension, rising to the top of the setting slurry. If too much water bleeds from the slurry, the surface may contain voids. If the surface is too dry, there may be insufficient water to hydrate the calcined gypsum. This leaves a powder on the surface of the flooring that makes it more difficult to adhere finished floor goods such as vinyl or ceramic tile, without additional preparation. Wear resistance of the floor is also reduced. Some dispersants rise to the top of the slurry with the water, leaving the dispersant unevenly distributed in the bottom of the fluid. If the dispersant rises into the water film on top of the slurry, the surface water can become sticky, leaving a poor surface that is difficult to finish.

Thus, there remains the need in the field for gypsum cement compositions that stabilize aggregate in suspension and prevent its sedimentation.

SUMMARY

This disclosure provides compositions and methods that are useful in addressing aggregate-sedimentation problems. In one aspect, this disclosure relates to a calcium sulfate hemi-hydrate/cement composition that comprises an aggregate stabilizing mixture, wherein the aggregate stabilizing mixture contains at least one polysaccharide gum, preferably xanthan and/or diutan gum, and at least one polyacrylamide-gelatin blend, preferably the composition further comprises polyethylene glycol. The calcium sulfate hemi-hydrate/cement compositions in this disclosure have several technical advantages over conventional calcium sulfate hemi-hydrate/cement compositions. The technical advantages are attributed to the synergistic effect of a polysaccharide gum in combination with a polyacrylamide-gelatin blend. The technical advantages include stabilization of aggregate in suspension and achieving an optimal surface water balance while a gypsum cement product is hardening.

In a first aspect, this disclosure provides a composition for producing a gypsum cement slurry, the composition comprising:
 a) calcium sulfate hemi-hydrate;
 b) cement;
 c) a dispersant;
 d) a defoamer; and
 e) an aggregate stabilizing mixture, wherein the aggregate stabilizing mixture comprises:
  a polysaccharide gum in an amount from 0.001% to 0.5% by weight of the composition, and
  a polyacrylate-gelatin blend in an amount from 0.00125% to 0.01% by weight of the composition; and
 wherein the composition is a dry mixture.

Suitable polysaccharide gums include one or more of the following: xanthan gum, welan gum and/or diutan gum. In some preferred embodiments, the aggregate stabilizing mixture may comprise alpha-calcined gypsum.

In the composition, calcium sulfate hemi-hydrate may be supplied as calcined gypsum, synthetic gypsum or any combination thereof. In some compositions, cement may be class C cement in an amount from 0.5% to 50% by weight.

In some preferred embodiments, the composition may further comprise polyethylene glycol in an amount from 0.1% to 10% by weight of the composition.

Some compositions may comprise at least one set retarding agent and/or at least one set accelerating agent. Some compositions may further comprise at least one aggregate which may include one or more of the following: sand, perlite, glass beads, rock, gravel, silica fume, clay, pumice, foam, vermiculite, fly ash, slag, silica fume, or any combination thereof in an amount from about 100 parts by weight to about 300 parts by weight of aggregate per 100 parts by weight of the composition.

In some preferred embodiments, the composition may further comprise sand in an amount from about 1 to about 2 cubic feet of sand per 80 pounds of the composition.

Some preferred embodiments include those in which the composition is further characterized by one or more of the following features:
 the dispersant in an amount from about 0.2% to about 10% by weight; and/or
 the defoamer in an amount from about 0.1% to about 1% by weight.

At least some of the compositions may further comprise one or more of the following: a set retarding agent and/or a set accelerating agent. In some preferred embodiments of the composition, calcium sulfate hemi-hydrate may be spray-coated with a set retarding agent.

In a second aspect, the present disclosure provides a gypsum cement slurry, the gypsum cement slurry comprising:
 i) any of the compositions described in the first aspect;
 ii) at least one aggregate; and
 iii) water, and
 wherein water is used in an amount from about 190 cubic centimeters (cc) to about 400 cubic centimeters (cc) per 1,000 grams of components i) and ii); and
 wherein the weight by weight (w/w) ratio of component ii) to component i) is in the range from 1:1 to 3:1.

Some preferred gypsum cement slurries include those wherein the aggregate is one or more of the following: sand, perlite, glass beads, rock, gravel, silica fume, clay, pumice, foam, vermiculite, fly ash, slag, silica fume, or any combination thereof.

In a third aspect, this disclosure provides methods of preparing a calcium sulfate hemi-hydrate/cement composition, the methods comprising:
a) mixing together an aggregate stabilizing mixture containing alpha-calcined calcium sulfate hemihydrate, a polysaccharide gum and polyacrylamide-gelatin blend; and
b) mixing the mixture of step a) into a composition comprising at least the following components: calcined gypsum and/or synthetic gypsum, and cement
wherein the aggregate stabilizing mixture is mixed in step b) in an amount resulting in the composition comprising:
a polysaccharide gum in an amount from 0.001% to 0.5% by weight of the composition, and
a polyacrylate-gelatin blend in an amount from 0.00125% to 0.01% by weight of the composition.

In these methods, the aggregate stabilizing mixture may contain the polysaccharide gum in an amount from 1% to 30% by weight and polyacrylamide-gelatin blend in an amount from 0.05% to 5% by weight.

In a fourth aspect, this disclosure provides methods for producing a gypsum cement product.

DETAILED DESCRIPTION

Figure 1:
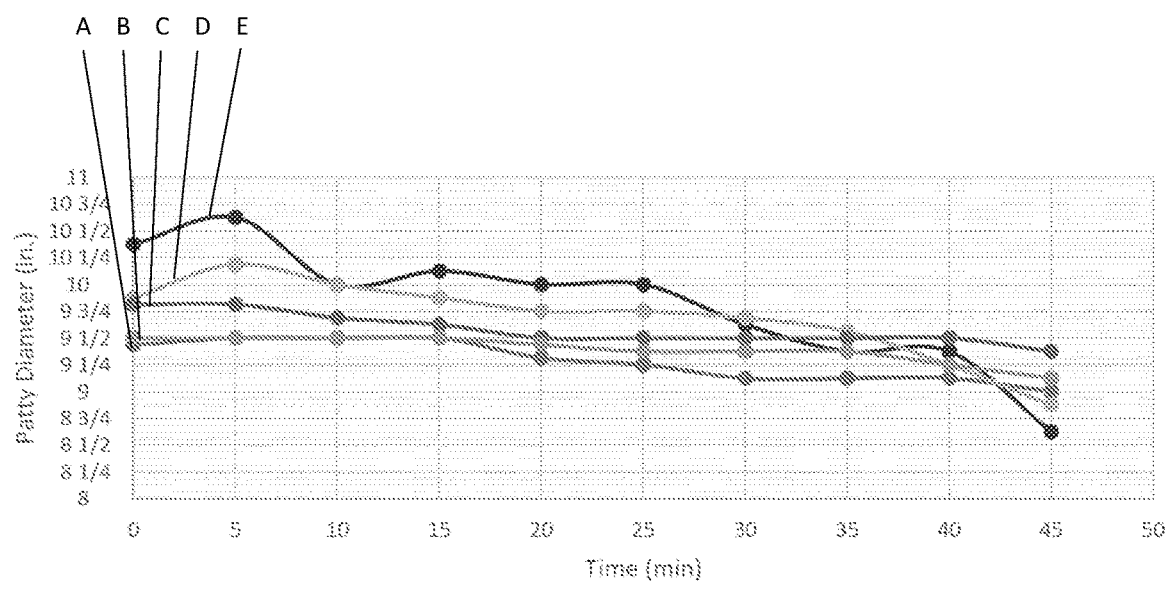
FIG. 1 reports a slump test for gypsum cement slurries containing a polysaccharide gum in various amounts, but no polyacrylamide-gelatin blend.

In one aspect, this disclosure relates to a calcium sulfate hemi-hydrate/cement composition that comprises an aggregate stabilizing mixture, wherein the aggregate stabilizing mixture contains at least one polysaccharide gum, preferably xanthan and/or diutan gum, and at least one polyacrylamide-gelatin blend. Preferably, the composition further comprises polyethylene glycol. These compositions are useful in various construction applications, including for producing pourable/pumpable self-leveling floor underlayment.

The calcium sulfate hemi-hydrate/cement compositions have several technical advantages over conventional calcium sulfate hemi-hydrate/cement compositions. The technical advantages are attributed to the synergistic effect of a polysaccharide gum in combination with polyacrylamide-gelatin blend. The technical advantages include, but are not limited to, stabilization of aggregate in suspension for a longer period of time, extended workability for a gypsum cement slurry formulated with the composition, and an optimized surface water balance while the gypsum cement slurry is hardening.

The "workability" of a calcium sulfate hemi-hydrate/cement composition can be evaluated by a slump test as described in this disclosure in connection with FIGS. 1-5.

The calcium sulfate hemi-hydrate/cement compositions are dry mixtures which can be mixed with water, sand and/or some other aggregate into a gypsum cement slurry. A "dry mixture" is used in its common meaning and means not mixed with water or other liquid.

In some preferred embodiments, a calcium sulfate hemi-hydrate/cement composition according to this disclosure may comprise:
a) from about 0.001% to about 0.5% by weight, more preferably from 0.002% to 0.2% by weight, and most preferably from 0.002% to 0.15% by weight of a polysaccharide gum; and
b) from about 0.00125% to about 0.01% by weight, more preferably from 0.00125% to 0.008% by weight, and most preferably from 0.00125% to 0.005% by weight of at least one polyacrylamide-gelatin blend.

In some preferred embodiments, the composition further comprises polyethylene glycol, preferably in an amount from 0.1% to 10% by weight of the composition. It was unexpectedly found that a combination of a polysaccharide gum with at least one polyacrylamide-gelatin blend stabilizes suspension of an aggregate, e.g., sand, in a gypsum cement slurry made with the calcium sulfate hemi-hydrate/cement composition better than the same polysaccharide gum without the polyacrylamide-gelatin blend.

This disclosure reports that using an aggregate stabilizing mixture, wherein the aggregate stabilizing mixture contains at least one polysaccharide gum, preferably xanthan and/or diutan gum, and at least one polyacrylamide-gelatin blend, preferably co-blended with polyethylene glycol, instead of a polysaccharide gum alone, improves suspension of an aggregate and extends working properties of the gypsum cement slurry. The aggregate stabilizing mixture according to this disclosure unexpectedly stabilizes an aggregate in suspension, even as the aggregate stabilizing mixture may contain less of a polysaccharide gum in comparison to compositions in which the polysaccharide gum is used alone. As most polysaccharide gums are biopolymers produced via aerobic fermentation with enzymes, decreasing an amount of polysaccharide gums while also improving rheological properties of a gypsum cement slurry may also decrease carbon footprint and reduce manufacturing costs.

Preferred ratios of the polysaccharide gum to the polyacrylamide-gelatin blend in the calcium sulfate hemi-hydrate/cement composition depend on several different factors, including a particular polysaccharide gum being used. Some preferred ratios are in the range from starting at 3 parts by weight of the polysaccharide gum to 1 part by weight of the polyacrylamide-gelatin blend (3:1) and up to 20 parts by weight of the polysaccharide gum to 1 part by weight of the polyacrylamide-gelatin blend (20:1), including, but are not limited to, 5:1; 6:1; 7:1; 7.5:1; 10:1; 15:1; 17.5:1 or 19:1. When the polysaccharide gum is a diutan gum, the most preferred ratio of diutan gum to a polyacrylamide-gelatin blend is 5:1 by weight.

The aggregate stabilizing mixtures according to this disclosure include 1) at least one polysaccharide gum and 2) at least one polyacrylamide-gelatin blend.

"Polysaccharide gums" are non-starch polymers soluble in water and having the ability to thicken (gel) water and aqueous systems. Polysaccharide gums are hydrocolloids. Typically, polysaccharide gums contain two or more kinds of monosaccharides forming a repeating unit which is then polymerized into a polysaccharide gum. Exemplary monosaccharides include, but are not limited to, galactose, arabinose, xylose, glucose, rhamnose, and/or glucuronic acid, among others.

Suitable polysaccharide gums can be produced by fermentation, for example, as disclosed in U.S. Pat. Nos. 5,175,278 and 6,110,271, the disclosure of which is herein incorporated by reference. Polysaccharide gums can be referred to as biopolymers. Polysaccharide gums impart different rheological properties to the systems that they thicken.

In some embodiments of the aggregate stabilizing mixture, preferred polysaccharide gums may include xanthan gum, diutan gum and/or welan gum. In some embodiments, diutan gum is particularly preferred. Suitable polysaccharide gums include a polysaccharide gum disclosed in U.S. Pat. Nos. 5,175,278 and 6,110,271. One particularly preferred xanthan gum is available under the tradename KELZAN™ (CP Kelco, Atlanta, GA).

Diutan gum is a high-molecular weight gum that can be produced by carefully controlled aerobic fermentation. One particularly preferred diutan gum is available under the tradename KELCOCRETE™ (CP Kelco, Atlanta, GA).

Welan gum is a high-molecular weight polysaccharide gum composed of repeating tetrasaccharide units with single branches of L-mannose or L-rhamnose. The use of welan gums in cement compositions is known from U.S. Pat. No. 5,004,506, the entire disclosure of which is incorporated by reference.

Other polysaccharide gums suitable in compositions according to this disclosure may include polysaccharide gums available under the tradenames STARVIS™ 3040 and/or STARVIS™ 3090 (BASF, Germany).

The second necessary component in the aggregate stabilizing mixtures according to this disclosure contains a polyacrylamide-gelatin component blend. Preferred monomers for the polyacrylamide component include, but are not limited to, acrylamide, bis-acrylamide, acrylic acid, vinylsulfonic acid, or any combination thereof. Gelatin is a hydrolysate formed from collagen. Preferred gelatin components include those with a low bloom value of 0 to 50. In some preferred polyacrylamide-gelatin blends, the gelatin component can be used in proportions of 10% to 90% by weight, preferably 25% to 75% by weight and the polyacrylamide component can be used in proportions of 90% to 10% by weight, preferably 75 to 25% by weight.

Suitable polyacrylamide-gelatin blends include those available under the tradename STARVIS™ T-51F (BASF, Germany).

In some preferred embodiment, the polyacrylamide-gelatin blend may be further co-blended with polyethylene glycol. In some embodiments of the calcium sulfate hemi-hydrate/cement composition, polyethylene glycol may be included in an amount from about 0.1% to about 10% by weight of the calcium sulfate hemi-hydrate/cement composition.

It was previously known in the art that a polysaccharide can be used in combination with lignosulfonate in gypsum cement compositions, as disclosed in U.S. Pat. No. 7,754,007, the entire disclosure of which is incorporated herein by reference. However, and as is provided in this disclosure, it has been unexpectedly found that the rheology of a gypsum cement slurry can be greatly improved, including the capacity to stabilize suspension of sand in the slurry, if a polysaccharide gum is used in combination with at least one polyacrylamide-gelatin blend. The effect is unexpected, and it cannot be achieved by simply using a larger quantity of a polysaccharide gum alone.

In some embodiments, calcium sulfate hemi-hydrate/cement compositions according to this disclosure are preferably dry mixtures, and they may comprise at least the following components: 1) calcium sulfate hemi-hydrate; 2) cement; 3) a dispersant; 4) a defoamer; 5) at least one polysaccharide gum; and 6) at least one polyacrylamide-gelatin blend. In some embodiments, the compositions further comprise polyethylene glycol, preferably in an amount from 0.1% to 10% by weight of the composition.

In the calcium sulfate hemi-hydrate/cement compositions, calcium sulfate hemi-hydrate can be supplied as calcined gypsum and/or as synthetic gypsum. Suitable calcined gypsum and/or synthetic gypsum may be spray-coated with an additive which may include a set retarding agent, e.g., diethylenetriamine pentaacetic acid (DTPA) and/or a dispersant. Spray-coated calcined gypsum and/or spray-coated synthetic gypsum can be produced according to methods disclosed in U.S. Pat. Nos. 8,343,273 and 9,944,556, incorporated herein by reference.

In this disclosure, calcium sulfate hemihydrate may be used interchangeably with calcined gypsum, calcium sulfate semi-hydrate or calcium sulfate half-hydrate. Gypsum can be sourced from mines in the dihydrate form ($CaSO_4 \cdot 2H_2O$). Gypsum is then calcined in order to drive off some water, which produces calcium sulfate hemihydrate. Depending on various factors, including the source of gypsum and also the method by which gypsum is calcined, calcium sulfate hemihydrate can be produced in the alpha-crystal form or the beta-crystal form. Alpha crystals are less acicular than beta crystals. As described in U.S. Pat. No. 7,504,165, the entire disclosure of which is incorporated by reference, alpha-calcined gypsum differs in its water demand from beta-calcined gypsum, with alpha-calcined gypsum requiring less water for forming a flowable slurry.

In some embodiment, the calcium sulfate hemi-hydrate/cement composition according to this disclosure may comprise from about 50% to about 98% by weight of calcium sulfate hemi-hydrate, and preferably from 90% to 98% by weight of calcium sulfate hemi-hydrate, and most preferably from 95% to 98% of calcium sulfate hemi-hydrate. Suitable calcium sulfate hemi-hydrate includes alpha calcium sulfate hemi-hydrate, beta calcium sulfate hemi-hydrate, continuously calcined synthetic gypsum, or any mixtures thereof. In some preferred embodiments, at least 50% by weight of calcium sulfate hemi-hydrate is beta calcium sulfate hemi-hydrate and/or continuously calcined synthetic gypsum. In some other preferred embodiments, the amount of the beta-calcined form is greater than 50% by weight or greater than 90% by weight of the total calcium sulfate hemihydrate.

At least in some embodiments, the second component in the calcium sulfate hemi-hydrate/cement composition according to this disclosure may be cement. In some embodiments of the composition, cement can be used in an amount ranging from 0.5% to 50% by weight, preferably from 0.5% to 10% by weight, and most preferably from 0.5% to 5% by weight. Suitable cements include, but are not limited to, Portland cement Type I, Type III or Type V under ASTM standard specification C150. A particularly preferred cement is Cement Class C with high early strength, which meets ASTM standard specification C150 Type III. Blended hydraulic cements such as Portland-limestone cement, Portland-slag cement, Portland-pozzolan cement can be also used. In some embodiments, the compositions may further comprise one or more of limestone, mica, fly ash, perlite and/or glass beads. Certain embodiments of the calcium sulfate hemi-hydrate/cement composition may contain one or more of these additives in any amount from about 1% to about 40% by weight.

The third component in the calcium sulfate hemi-hydrate/cement composition according to this disclosure is a dispersant. Preferred dispersants include polycarboxylate ether (PCE) based dispersants, naphthalene sulfonate formaldehyde polycondensates, sulfonated melamine polycondensates and acrylic-acid co-polymers as described in U.S. Pat. Nos. 6,777,517 and 7,504,165, and 8,088,218, incorporated by reference. In some preferred embodiments of the calcium sulfate hemi-hydrate cement composition, the dispersant can be used in concentrations from about 0.2% to about 10% by weight, more preferably from about 0.2% to about 5% by weight, and most preferably, from about 0.2% by weight to about 2.5% by weight. Some preferred dispersants are polycarboxylate ether (PCE) based dispersants having a comb-like structure containing polyethylene glycol side chains and carboxylic or phosphate groups as charge carrier, available under the tradename MELFLUX™ (BASF, Germany).

The fourth component in the calcium sulfate hemi-hydrate/cement composition according to this disclosure may be a defoamer. Defoamers are necessary in order to eliminate formation of air bubbles and foam during mixing with water as air bubbles may cause surface defects and reduced strength in underlayment.

Suitable defoamers include those based on fatty alcohol-alkoxylates and polysiloxane on an inorganic carrier material, commercially available under trade name VINAPOR™ DF 9010F (BASF, Germany). Other suitable defoamers include, but are not limited to, FOAMASTER CN (Astro Chemicals, Kankakee, IL) and AGITAN P-801, P-800, P-823 (Munzing Chemie, Heilbronn, Germany).

Some preferred embodiments of the calcium sulfate hemi-hydrate/cement composition may contain at least one defoamer in an amount from about 0.1% to about 1% by weight, more preferably from about 0.2% to about 0.8% by weight, and most preferably, from about 0.2% by weight to about 0.5% by weight.

The calcium sulfate hemi-hydrate/cement compositions according to this disclosure may further comprise other additives, including one or more of the following: at least one set retarding agent, at least one set accelerating agent, at least one biocide, at least one pH adjuster, a coloring agent (pigment, stain, or dye, e.g., titanium dioxide), or any combination thereof.

Set retarding agents can be used in order to increase the working time (workability) of the gypsum cement slurry. Any set retarding agents suitable for slowing a hydration reaction of calcium sulfate hemihydrate can be used, including, but not limited to, SUMA, diethylenetriamine pentaacetic acid (DTPA), tartaric acid, citric acid, maleic acid and/or their corresponding salts, including in particular, potassium sodium tartrate, sodium citrate, and/or cream of tartar (potassium bitartrate). A set retarding agent can be optionally added to the calcium sulfate hemihydrate/cement composition in small amounts, e.g., between 0.0125% and 1.5% by weight, preferably between 0.05% and 1.0% by weight, and most preferably between 0.05% and 0.5% by weight. In at least some embodiments, calcium sulfate hemi-hydrate can be spray-coated with one or more set retarding agents, for example by using methods described in U.S. Pat. Nos. 8,343,273 and 9,944,556.

Biocides are commonly used for preventing growth of mildew and mold. One example of a suitable biocide is boric acid. A biocide can be optionally added to the calcium sulfate hemihydrate/cement composition in small amounts, e.g., from 0.0125% and 1.5% by weight, preferably, between 0.05% and 1% by weight and most preferably, between 0.05% and 0.5% by weight.

Set accelerators, which can be also referred to as set accelerating agents, are commonly used for accelerating a setting reaction of gypsum cement. A set accelerator can be optionally added to the calcium sulfate hemihydrate/cement composition in small amounts, e.g., between 0.001% and 1.00% by weight and preferably, between 0.005% and 0.5% by weight. Preferred set accelerators may include, but are not limited to, calcium sulfate anhydrate, calcium sulfate dihydrate, potassium sulfate, aluminum sulfate, sodium sulfate, and/or sodium disulfate. Two preferred accelerators are well known in the art as "HRA accelerator" and "CSA accelerator."

"CSA" is a set accelerator made according to U.S. Pat. No. 3,573,947, incorporated by reference, and comprising 95% calcium sulfate dihydrate co-ground with 5% sugar and heated to 250° F. (121° C.).

"HRA" comprises calcium sulfate dihydrate freshly ground with sugar at a ratio of about 3 to 25 pounds of sugar per 100 pounds of calcium sulfate dihydrate, as described in U.S. Pat. No. 2,078,199, incorporated by reference.

Table 1 provides some preferred embodiments of the calcium sulfate hemi-hydrate/cement compositions according to this disclosure.

TABLE 1

Calcium Sulfate Hemi-Hydrate/Cement Composition

| Component | Amount (wt. %) | Preferred Amount (wt %) | Most Preferred Amount (wt %) |
|---|---|---|---|
| Calcium Sulfate Hemihydrate (e.g., calcined gypsum) | 50-98 | 90-98 | 95-98 |
| Cement (e.g., Class C cement) | 0.5-50 | 0.5-10 | 0.5-5 |
| Dispersant (e.g., MELFLUX™ PCE) | 0.2-10 | 0.2-5 | 0.2-2.5 |
| Defoamer (e.g., VINAPOR™ DF 9010F) | 0.1-1 | 0.2-0.8 | 0.2-0.5 |
| Polysaccharide Gum (e.g., STARVIS™ 3090 or KELCOCRETE™) | 0.001-0.5 | 0.002-0.15 | 0.002-0.2 |
| Polyacrylamide-Gelatin Blend (e.g., STARVIS™ T-51F) | 0.00125-0.01 | 0.00125-0.008 | 0.00125-0.005 |
| Polyethylene Glycol, if present | 0.1-10 | 0.1-7 | 0.1-5 |
| Set retarding agent, if present | 0.0125-1.5 | 0.05-1.0 | 0.05-0.5 |
| Set accelerating agent, if present | 0.001-1 | 0.005-0.5 | 0.005-0.5 |
| Biocide, if present | Less than 1% | Less than 1% | Less than 1% |
| Coloring agent, if present | Less than 1% | Less than 1% | Less than 1% |

In conventional gypsum cement slurries, it is common to use cellulose ethers as a thickener in order to improve suspension of aggregate and prevent its sedimentation from the gypsum cement slurry. For example, hydroxyethyl cellulose (HEC), hydroxyethyl methyl cellulose (HEMC, available under the tradename WALOCEL™ from Dow Inc., United States) and sodium carboxymethyl cellulose (CMC) are commonly used. However, it was unexpectedly found that the aggregate stabilizing mixture according to this disclosure in which a polysaccharide gum is used in combination with a polyacrylate-gelatin blend works better for stabilizing aggregate in the gypsum cement slurry in comparison to using the polysaccharide gum in combination with a cellulose ether. Thus, calcium sulfate hemi-hydrate/cement compositions according of this disclosure can be prepared without a cellulose-based thickener.

In some preferred embodiments of a calcium sulfate hemi-hydrate/cement dry composition according to this disclosure, one or more polysaccharide gums and polyacrylamide-gelatin blend, preferably co-blended with polyethylene glycol, can be mixed directly with the calcium sulfate hemi-hydrate/cement composition. However, in some other preferred embodiments, a polysaccharide gum and a polyacrylamide-gelatin blend, preferably co-blended with polyethylene glycol, are first mixed with alpha-calcined gypsum into a composition, with some preferred embodiments of these compositions being provided in Table 2. The aggregate stabilizing composition is then mixed with a calcium sulfate hemi-hydrate/cement composition. In some preferred embodiments, the aggregate stabilizing composition is mixed with the calcium sulfate hemi-hydrate/cement composition in any amounts suitable to achieve the final concentration of polysaccharide gum and polyacrylamide-gelatin blend as follows:

a) from about 0.002 to about 0.5% by weight, more preferably from 0.005 to 0.15% by weight, and most preferably from 0.01 to 0.1% by weight of a polysaccharide gum; and b) from about 0.00125 to about 0.01% by weight, more preferably from 0.00125 to 0.008% by weight, and most preferably from 0.00125 to 0.005% by weight of at least one polyacrylamide-gelatin blend.

In another aspect, this disclosure relates to an aggregate stabilizing mixture suitable for use in various gypsum cement compositions. The aggregate stabilizing mixtures according to this disclosure are preferably dried mixtures which may comprise in some embodiments at least the following three components: 1) calcined gypsum (calcium sulfate hemihydrate), preferably alpha-calcined gypsum; 2) at least one high molecular weight polysaccharide gum, preferably xanthan gum, diutan gum or welan gum; and 3) polyacrylamide-gelatin blend.

The first component in the aggregate stabilizing mixture according to this disclosure contains calcined gypsum (calcium sulfate hemihydrate), preferably alpha-calcined gypsum. The aggregate stabilizing composition may comprise calcined gypsum, preferably alpha-calcined gypsum, in an amount from 70 to 98% by weight, preferably from 85 to 97% by weight, and most preferably, 90 to 95% by weight.

Alpha-calcined gypsum can be made by a continuous process or a lump rock process in which calcium sulfate dihydrate is calcined under pressure. Examples of suitable methods for producing alpha-calcined gypsum (alpha calcium sulfate hemihydrate) include those disclosed in U.S. Pat. No. 7,504,165.

The aggregate stabilizing mixtures according to this disclosure preferably comprise alpha-calcined gypsum. Any alpha-calcined calcium sulfate hemihydrate is suitable for use in the present aggregate stabilizing composition. Preferred alpha-calcined calcium sulfate hemihydrates include those made by a slurry process, such as HYDROCAL™ C-Base, J-Base or E-Base (United States Gypsum Company, Chicago, IL) or by a lump rock process, such as HYDROCAL™ A-Base or B-Base (United States Gypsum Company, Chicago, IL).

The second component in the aggregate stabilizing mixtures according to this disclosure includes at least one polysaccharide gum. In some embodiments of the aggregate stabilizing composition, a polysaccharide gum may be used in an amount from 1 to 30% by weight, preferably from 2 to 25% by weight, and most preferably, 5 to 15% by weight.

In some embodiments of the aggregate stabilizing mixture, preferred polysaccharide gums may include xanthan gum, diutan gum and/or welan gum. In some embodiments, diutan gum is particularly preferred. Suitable polysaccharide gums include a polysaccharide gum disclosed in U.S. Pat. Nos. 5,175,278 and 6,110,271, both patents are incorporated herein by reference. One particularly preferred xanthan gum is available under the tradename KELZAN™ (CP Kelco, Atlanta, GA).

Diutan gum is a high-molecular weight gum that can be produced by carefully controlled aerobic fermentation. One particularly preferred diutan gum is available under the tradename KELCOCRETE™ (CP Kelco, Atlanta, GA).

Welan gum is a high-molecular weight polysaccharide gum composed of repeating tetrasaccharide units with single branches of L-mannose or L-rhamnose. The use of welan gums in cement compositions is known from U.S. Pat. No. 5,004,506, the entire disclosure of which is herein incorporated by reference.

Other polysaccharide gums suitable in the aggregate stabilizing compositions according to this disclosure may include polysaccharide gums available under the tradename STARVIS™ 3040 and/or STARVIS™ 3090 (BASF, Germany).

The third component in the aggregate stabilizing mixtures according to this disclosure contains a polyacrylamide-gelatin blend. Preferred monomers for the polyacrylamide component include, but are not limited to, acrylamide, bis-acrylamide, acrylic acid, vinylsulfonic acid, or any combination thereof. Gelatin is a hydrolysate formed from collagen. Preferred gelatin components include those with a low bloom value of 0 to 50. In some preferred polyacrylamide-gelatin blends, the gelatin component can be used in proportions of 10 to 90% by weight, preferably 25 to 75% by weight and the polyacrylamide component can be used in proportions of 90 to 10% by weight, preferably 75 to 25% by weight.

In some preferred embodiments, the polyacrylamide-gelatin blend may be further co-blended with polyethylene glycol. In some embodiments, polyethylene glycol may be included in an amount from about 0.1 to about 10% by weight.

In some embodiments of the aggregate stabilizing mixtures, a polyacrylamide-gelatin blend may be used in an amount from 0.05 to 5% by weight, preferably from 0.1 to 2% by weight, and most preferably, 0.5 to 1.5% by weight. Suitable polyacrylamide-gelatin blends include those available under the tradename STARVIS™ T-51F (BASF, Germany).

In addition to the three main components described above, some aggregate stabilizing mixtures according to this disclosure may further comprise additional ingredients, such as for example, as calcium carbonate and/or talc.

Some preferred embodiments of the aggregate stabilizing mixture according to this disclosure is shown in Table 2 below:

TABLE 2

Aggregate Stabilizing Mixture

| Component | Amount (wt. %) | Preferred Amount (wt. %) | Most Preferred Amount (wt. %) |
|---|---|---|---|
| Alpha-calcined gypsum (e.g., HYDROCAL™ C-BASE) | 65-98.5 | 73-97.5 | 88.5-94.5 |
| Polysaccharide Gum (e.g., xanthan or diutan gum) | 1-30 | 2-25 | 5-10 |
| Polyacrylamide-gelatin blend | 0.05-5 | 0.1-2 | 0.5-1.5 |

In yet another aspect, this disclosure provides gypsum cement slurries suitable in various construction applications, including as a pourable/pumpable self-leveling floor underlayment.

These gypsum cement slurries can be prepared by mixing together the calcium sulfate hemi-hydrate/cement composition of this disclosure, e.g., a composition shown in Table 1, with an aggregate, preferably containing sand, and water. Because the calcium sulfate hemi-hydrate/cement compositions of this disclosure harden when they are mixed with water, a gypsum cement slurry according to this disclosure must be mixed just prior to application.

The calcium sulfate hemi-hydrate/cement compositions according to this disclosure can be mixed with sand and optionally with some other aggregate, and water in order to obtain a gypsum cement slurry which hardens into a gypsum cement product, such as for example a floor underlayment. Preferred sands include, but are not limited to, fine sands, however, coarser sands can be also used. Suitable sands include, but are not limited to, river sand, Mohawk medium sand, Rich Mix fine sand, Atlanta sand, Dothan Sand, and Florida sand. Fine sands can be used in combination with coarser sands.

In some embodiments according to this disclosure, a gypsum cement slurry may comprise other aggregates in addition to or even instead of sand. Such suitable aggregates that can be used in gypsum cement mixtures according to this disclosure may include, but are not limited to, perlite, glass beads, rock, gravel, silica fume, clay, pumice, foam, vermiculite, fly ash, slag, silica fume, or any combination thereof. An amount of each aggregate depends on a particular application and the aggregate type. In some embodiments, gypsum cement slurries may comprise from about 100 parts by weight to up to 300 parts by weight of the aggregate per 100 parts by weight of the calcium sulfate hemi-hydrate/cement composition, which can be abbreviated as the ratio from 1:1 w/w to 3:1 w/w.

In order to prepare one embodiment of a gypsum cement slurry according to this disclosure, water is mixed with the calcium sulfate hemi-hydrate/cement composition and one or more aggregates at the site where gypsum cement product is to be used, e.g., the floor underlayment to be poured. The amount of water to be used in the gypsum cement slurry depends on a particular application. In further embodiments, the present disclosure relates to gypsum cement slurries suitable for pouring a floor underlayment. In some other embodiments, a gypsum cement slurry can be also made by mixing the calcium sulfate hemi-hydrate/cement composition with at least water. Sand and/or other aggregates can be omitted and/or replaced with other additives, e.g., fly ash.

In preferred embodiments, the gypsum cement slurries are prepared by mixing together at least the calcium sulfate hemihydrate/cement composition according to this disclosure, sand, water, and optionally one or more of other aggregates. Low-water gypsum cement slurries are particularly useful in pouring floor underlayments requiring strength and rapid set.

In some preferred embodiments, suitable gypsum cement slurries according to this disclosure may be prepared with water in an amount from about 150 cubic centimeters (which can be abbreviated in this disclosure as cc) to about 400 cubic centimeters of water per 1,000 grams of dry components in the gypsum cement slurry.

In this disclosure, low-water gypsum cement slurries include any gypsum cement slurries which are formulated with about 150 cc to about 300 cc of water per 1,000 grams of dry components in the gypsum cement slurry.

Thus, one of the technical advantages is that gypsum cement slurries can be prepared with low amounts of water. Surprisingly, these low-water gypsum cement slurries are still pourable and self-leveling.

Another technical benefit in some preferred embodiments according to this disclosure includes that it has been discovered that a synergistic interaction of the polysaccharide gum with the polyacrylamide-gelatin blend reduces the amount of the polyacrylamide-gelatin gum necessary for maintaining an aggregate, such as sand, in sufficiently suspended form in a gypsum cement slurry, wherein water can be used in low amounts, e.g., from about 150 cc to about 300 cc, and more preferably from about 190 cc to about 250 cc per 1,000 grams of dry components in the gypsum cement slurry.

With the aggregate stabilizing compositions according to this disclosure, a stable sand suspension may be achieved at sand ratios to the calcium sulfate hemihydrate/cement composition of 0.8:1 to 2.0:1, for example, 1:1, or 1.4:1 or 1.9:1, as expressed in units of cubic feet of sand per 80 lb sample of dry mixture (these units are an industry standard based on typical commercial packaging including 80 lb of dry mixture and the convenience to end users to specify sand content in cubic feet). Some preferred embodiments include those in which from about 1.4 to about 1.9 cubic feet of sand is mixed per each 80 pounds of the calcium sulfate hemihydrate/cement composition of this disclosure. In some preferred embodiments, sand and water are mixed with the calcium sulfate hemihydrate/cement composition just prior to application. However, in some embodiments, sand can be pre-mixed with the calcium sulfate hemihydrate/cement composition during manufacturing and prior to shipment to a construction site.

In yet another embodiment, the present disclosure relates to a dry mixture which comprises the calcium sulfate hemihydrate/cement composition of this disclosure, sand, and optionally one or more of the aggregates. In some of these mixtures, sand can be used in any amount from about 0.8 cubic feet to about 2.3 cubic feet of sand per one 80 lb bag of the calcium sulfate hemi-hydrate/cement composition, and more preferably from about 1.4 to about 1.9 cubic feet of sand per one 80 lb bag of the calcium sulfate hemi-hydrate/cement composition according to this disclosure. The total amount of all aggregates may be in the range from about 1:1 to about 3:1 w/w of the aggregate to the calcium sulfate hemi-hydrate/cement composition.

Referring to FIGS. 1 through 5, various gypsum cement slurries according to this disclosure were analyzed by a slump test which was conducted essentially as described in U.S. Pat. No. 7,504,165, herein incorporated by reference. The slump test is intended to simulate various conditions encountered when a floor is being poured and the slurry is pumped through a hose. For example, the pump may occasionally be stopped to switch to a different batch or to move the hose to a different section of the floor. During these times, the gypsum cement slurry sits undisturbed in the hose for several minutes before pumping is resumed.

In the slump test results of which are shown in FIG. 1 through FIG. 5, a 4000-gram sample was prepared based on the dry components which included the calcium sulfate hemi-hydrate/cement composition and aggregate (sand), which were weighed and dry-blended together. The predetermined amount of deionized water was measured and poured into a mixing bowl. The dry blended material was added to the water and the time noted as the starting point to determine the set time. The mixing bowl was placed onto a HOBART mixer and mixed for approximately five seconds. After one minute of soaking, the material was mixed at low speed for two minutes. The bowl was removed from the mixer and the contents stirred for about 15 seconds with a whisk to assure that all material was evenly mixed.

The initial slump sample was poured into a damp 2"×4" (5 cm×10 cm) cylinder placed on a plastic sheet, slightly overfilling the cylinder. Excess material was screeded from the top, then the cylinder was lifted up smoothly, allowing the slurry to flow out the bottom, making the patty. The patty was measured (±1/8") in two directions 90° apart, and the average reported as the patty diameter. The remaining sample material was permitted to set undisturbed in the pitcher for 5 minutes. Without stirring, additional slump samples were poured at five-minute intervals until all the material was gone or until the material set and could not be poured. The mix was not stirred between slump samples. All tests were conducted at room temperature (about 20° C. corresponding to about 68° degrees Fahrenheit) and under standard laboratory humidity conditions (about 40%).

In FIG. 1, five gypsum cement slurries were compared in a slump test. The slurries comprised different amounts of polysaccharide gum, but no polyacrylamide-gelatin blend. A sample in graph A contained 0.0094% by weight of KELCOCRETE polysaccharide gum, a sample in graph B contained 0.1% by weight STARVIS 3040 polysaccharide gum, a sample in graph C contained 0.075% by weight STARVIS 3040 polysaccharide gum, a sample in graph D contained 0.050% by weight of STARVIS 3040 polysaccharide gum, and a sample in graph E did not contain a polysaccharide gum. By comparing graphs A through E, it was discovered that increasing an amount of a polysaccharide gum alone does not increase significantly the stabilizing efficiency of the polysaccharide gum.

Figure 2:
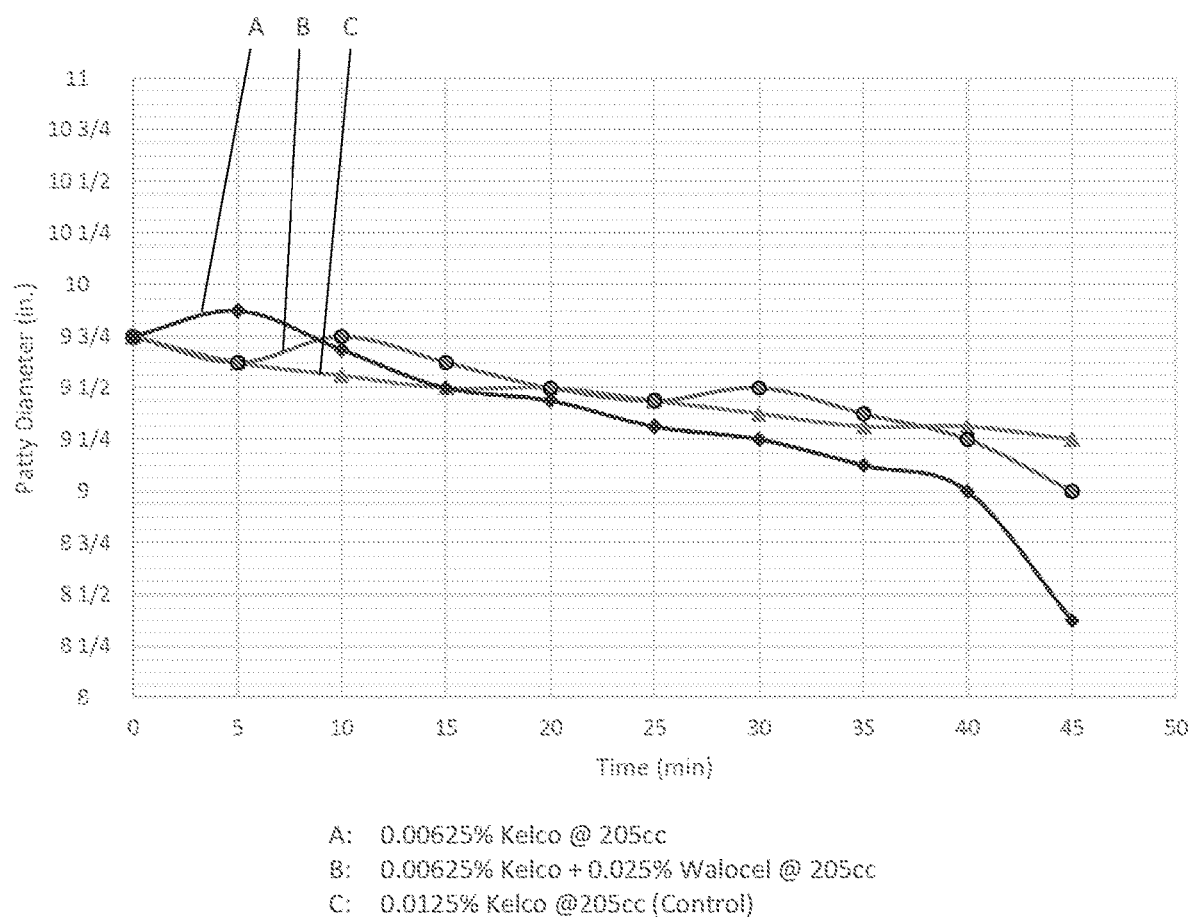
FIG. 2 reports a slump test for a gypsum cement slurry containing a polysaccharide gum in comparison to the gypsum cement slurry containing a combination of a polysaccharide gum and a modified cellulose thickener.

In FIG. 2, three gypsum cement slurries were compared in a slump test. A sample in graph A contained 0.00625% by weight of KELCOCRETE polysaccharide gum, a sample in graph B contained a combination of 0.00625% by weight of KELCOCRETE polysaccharide gum and 0.025% WALOCEL modified cellulose thickener, while a sample in graph C contained 0.0125% by weight of KELCOCRETE polysaccharide gum. By comparing graphs A through C, it was concluded that combining a polysaccharide gum with a modified cellulose thickener does not improve significantly the stabilizing efficiency of the polysaccharide gum.

Figure 3:
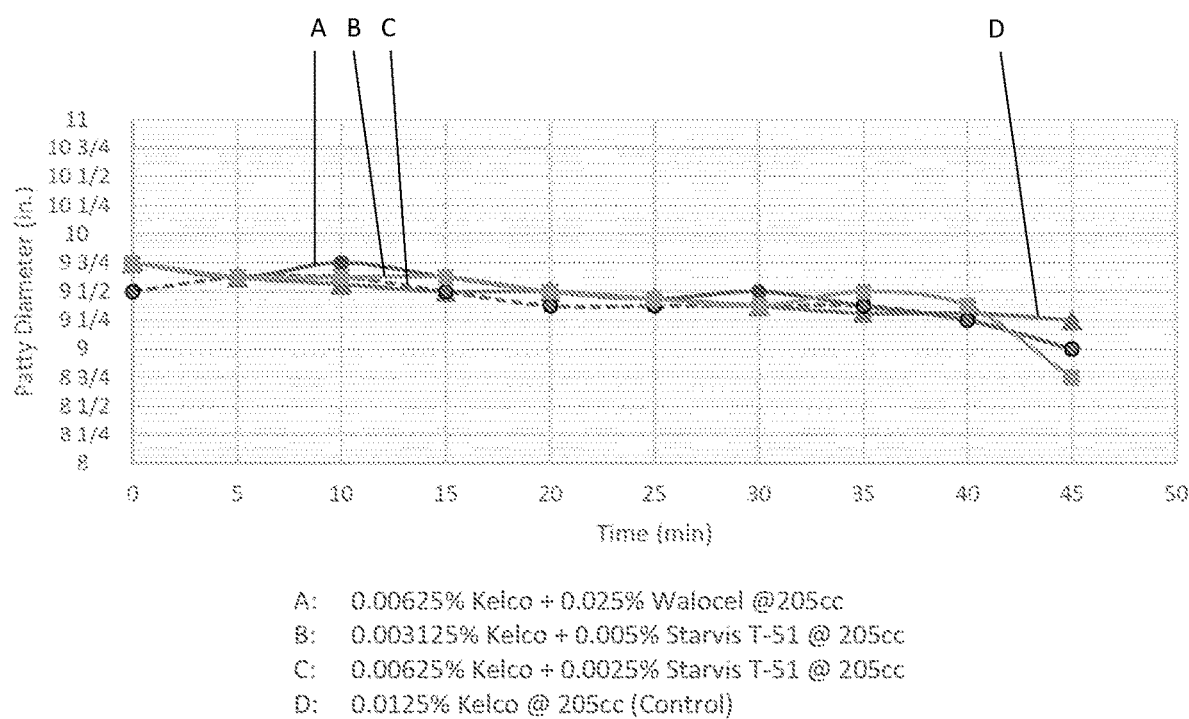
FIG. 3 reports a slump test for a gypsum cement slurry containing a polysaccharide gum in combination with polyacrylamide-gelatin blend in comparison to the gypsum cement slurry containing a combination of a polysaccharide gum and a modified cellulose thickener, or the gypsum cement slurry containing the polysaccharide gum alone.

In FIG. 3, four gypsum cement slurries were compared in a slump test. A sample in graph A contained 0.00625% by weight of KELCOCRETE polysaccharide gum and 0.025% by weight WALOCEL cellulose thickener, a sample in graph B contained a combination of 0.003125% by weight of KELCOCRETE polysaccharide gum and 0.005% by weight of STARVIS T-51 polyacrylate-gelatin blend, a sample in graph C contained 0.00625% by weight of KELCOCRETE polysaccharide gum and 0.0025% by weight STARVIS T-51 polyacrylate-gelatin blend, and a sample in graph D contained 0.0125% by weight KELCOCRETE polysaccharide gum. By comparing graphs A through D, it was concluded that a combination of a polysaccharide gum with polyacrylamide-gelatin blend stabilizes suspension of sand in a gypsum cement slurry better than the polysaccharide gum alone or the polysaccharide gum in combination with a cellulose thickener. Furthermore, it was possible to decrease the amount of the polysaccharide gum in the mixtures with polyacrylamide-gelatin blend, while still improving suspension of aggregate in the gypsum cement slurry. Decreasing the amount of a polysaccharide gum addresses the need for minimizing carbon footprint, while also reducing manufacturing costs.

Figure 4:
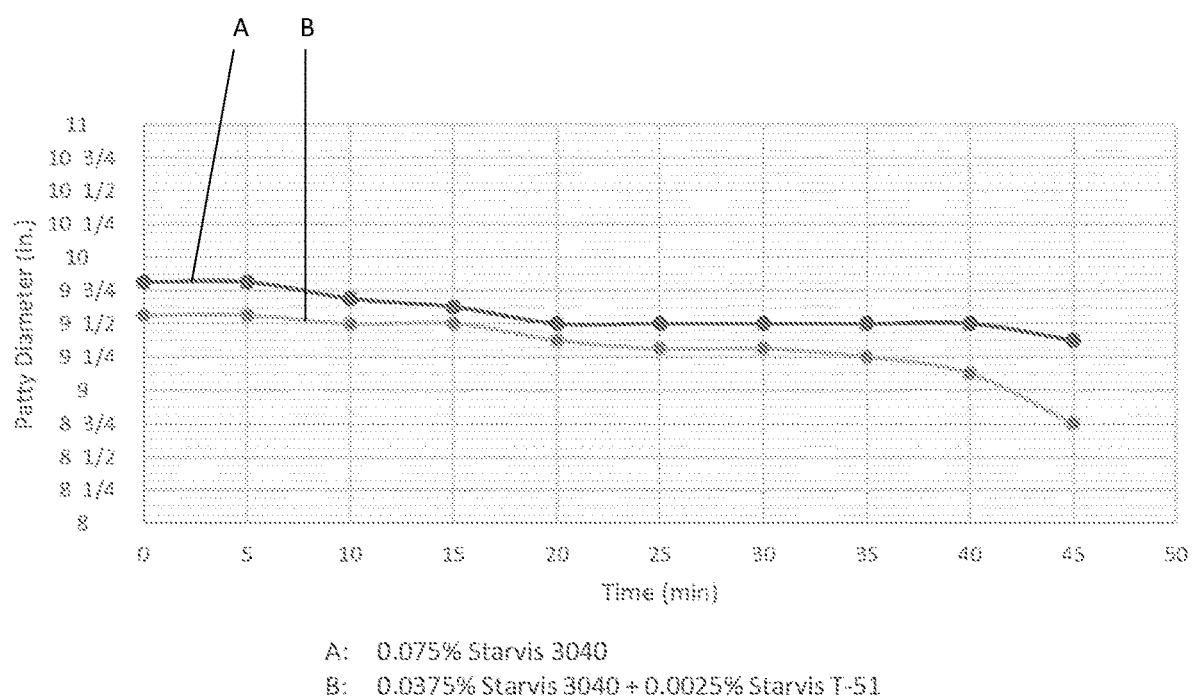
FIG. 4 reports a slump test for a gypsum cement slurry containing a polysaccharide gum in combination with polyacrylamide-gelatin blend in comparison to the gypsum cement slurry containing the polysaccharide gum alone.

In FIG. 4, two different gypsum cement slurries were compared in a slump test. A sample in graph A contained 0.075% by weight of STARVIS 3040 polysaccharide gum, while a sample in graph B contained 0.0375% by weight of STARVIS 3040 polysaccharide gum and 0.0025% by weight of STARVIS T-51 polyacrylate-gelatin blend. By comparing graphs A and B, it was concluded that a combination of a polysaccharide gum with polyacrylamide-gelatin blend stabilizes suspension of sand in a gypsum cement slurry better than the polysaccharide gum alone.

Figure 5:
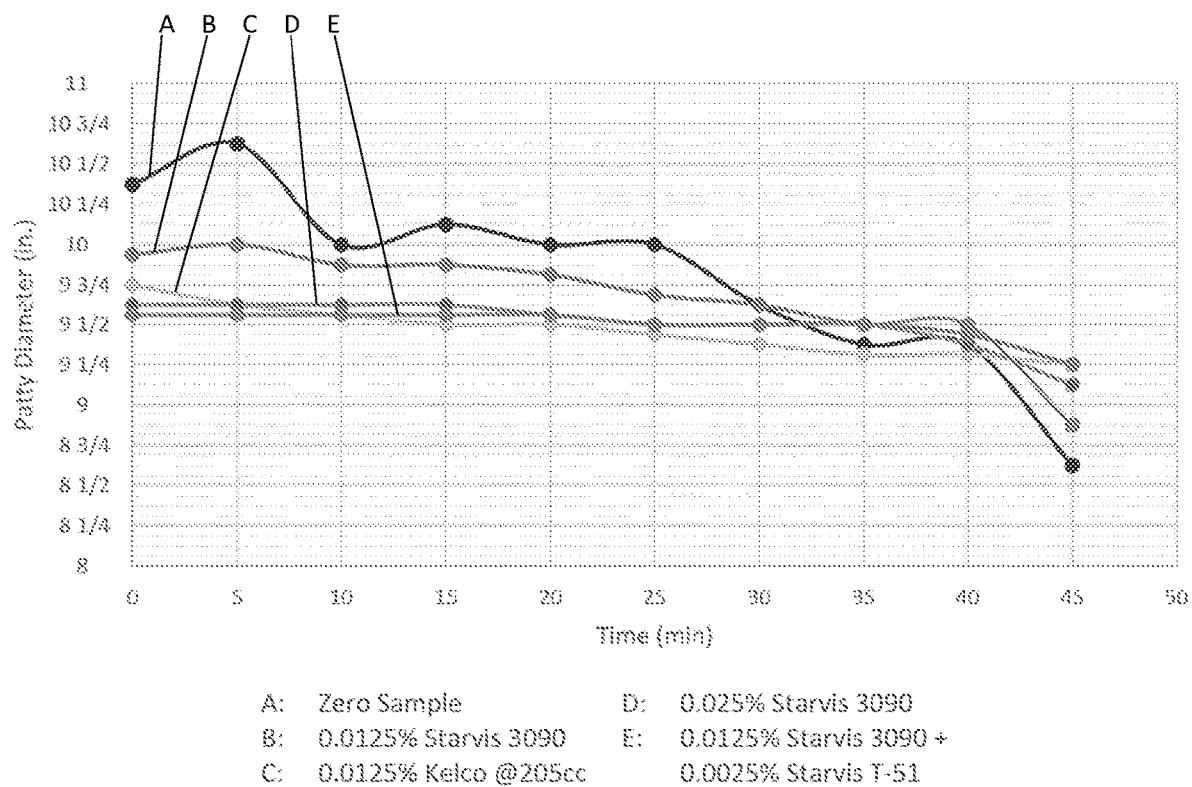
FIG. 5 reports a slump test for a gypsum cement slurry containing one polysaccharide gum in combination with polyacrylamide-gelatin blend in comparison to the gypsum cement slurry containing another polysaccharide gum or the same polysaccharide gum alone.

In FIG. 5, five different gypsum cement slurries were compared in a slump test. A sample in graph A did not contain any polysaccharide gum, a sample in graph B contained 0.0125% by weight of STARVIS 3090 polysaccharide gum, a sample in graph C contained 0.0125% by weight of KELCOCRETE polysaccharide gum, a sample in graph D contained 0.025% by weight of STARVIS 3090 polysaccharide gum, while a sample in graph E contained a combination of 0.0125% by weight of STARVIS 3090 polysaccharide gum and 0.0025% by weight of STARVIS T-51 polyacrylamide-gelatin blend. By comparing graphs A through E, it was concluded that reducing the amount of a polysaccharide gum without adding an polyacrylate-gelatin enhancer negatively impacts suspension of sand as a significant reduction in slump time was observed.

Unexpectedly, the use of the aggregate stabilizing mixture which contains a combination of a polysaccharide gum and polyacrylamide-gelatin blend provides for early stabilization of a pourable/pumpable gypsum cement slurry, while also extending the working time after which the gypsum cement slurry hardens. It was also found that it is possible to significantly reduce the amount of a polysaccharide gum if the polysaccharide gum is used in combination with polyacrylamide-gelatin blend.

In addition to the slump tests, various gypsum cement slurries according to this disclosure were also analyzed for 1) bleed water, 2) product density and 3) compressive strength, essentially as described in U.S. Pat. No. 7,504,165, herein incorporated by reference.

Bleed water was determined as the excess amount of water on the surface of the samples after the material had set. A 130 mL sample was poured into a 240 mL set cup and allowed to set until Vicat set was achieved. The cup containing the sample and the bleed water was weighed (±0.10 g.). Next, the bleed water was poured off and the cup shaken to remove all excess water. The cup and sample were re-weighed. The bleed water was calculated as follows:

(Initial Weight−Final Weight)÷Initial Weight*100=% Bleed Water

Aggregated two-inch cubes were used to test density and compressive strength. Cube molds were prepared by sealing the bottom of the mold with petroleum jelly to prevent leaking and lubricating the molds with an approved release agent, such as WD-40. Sample material was poured into the corner of the cubes until they were approximately ¾ full, stirring to keep the sand suspended if needed. Using a small spatula, the sample material was vigorously agitated from corner to corner for 3-5 seconds, eliminating all bubbles in the cube. The cubes were then filled to slightly overfull, and the remaining sample material poured into the set cup for additional testing. Excess sample was screeded from the cube molds ten minutes after Vicat set and the cubes were carefully removed from the molds approximately 50 minutes later. About 24 hours after the cubes were made, they were placed in a 110° F. (43° C.) forced air oven for eight days until constant weight was achieved.

Density of the samples was determined by weighing a number of dried cubes and applying the following formula:

Density $(lb/ft^3)$=(Weight of cubes*0.47598)÷number of cubes

Aggregated cubes were used to test for compressive strength using a compressive strength testing machine. Cubes were placed between two platens. Force was applied to the cube as the platens were pushed together. The machine recorded the pounds of force that were required to crush the cube. Total force in pounds was converted to pounds per square inch (psi) by dividing by the surface area of the sample, in this case 4 $in^2$ (25 $cm^2$).

References to set time refer to Vicat set time per ASTM C-472. The Vicat set time started from the time the plaster was added to the water for hand mixes and from the time the slurry came off the mixer for machine mixes. A sample was made up of 50 grams of dry, aggregate-free material and sufficient water to make a normal consistency for the desired application. The sample was poured onto an acrylic sheet to form a patty. A 300-gram Vicat needle was held half-way between the center and the outer edge of the patty, perpendicular to the patty surface. The needle was held to the patty surface and released to fall freely of its own weight. Set time was determined when the needle failed to penetrate to the bottom of the patty. If the degree of penetration was unclear, the needle was given a little push to determine if it had touched the underlying surface.

Results of these tests are reported in Example 3. These tests further support a conclusion that the aggregate stabilizing mixture according to this disclosure is highly efficient in maintaining sand suspension, slump and flow for extended periods of time. Thus, gypsum cement slurries of this disclosure are suitable in many different applications.

Some applications for the gypsum concrete slurries according to this disclosure include, but are not limited to, floor underlayment, including, a self-leveling underlayment, anhydrite/gypsum floor screeds, panel technologies, including structural panels and access panels, and gypsum cement products that comprise glass beads and/or perlite. Other applications for gypsum cement slurries according to this disclosure may include as a building material in wood-frame and/or concrete construction for floor leveling and/or fire ratings. In addition, the gypsum cement slurries according to this disclosure can be also used as joint grouts or as a repair patch for cracks and other panel defects.

The gypsum-cement slurries according to this disclosure can be used over a great variety of different substrates, including, but not limited to, wood, steel, concrete, tiles, and/or gypsum wallboard.

In yet another aspect, this disclosure provides a method for producing floor or floor underlayment. These methods may include preparing a gypsum cement slurry at a jobsite where floor or underlayment is to be laid by mixing in a mixing vessel the calcium sulfate hemi-hydrate/cement composition of this disclosure, one or more aggregates, preferably containing sand, with a measured amount of water. The gypsum cement slurry is then applied, pumped, dumped or poured onto a substrate and allowed to set, forming floor or floor underlayment. Suitable substrates may include wood or concrete. In some applications, floor or underlayment surface may be optionally finished by any technique known in the field, including, but not limited to, floating, pinrolling or screeding.

One preferred embodiment includes methods in which a gypsum cement slurry is pumped through a hose in order to produce a self-leveling underlayment or floor. In these applications, the gypsum cement slurry is formulated to be free flowing, by using an appropriate amount of water. Unexpectedly, it was discovered that the gypsum cement slurries of this disclosure may be prepared as highly fluid and yet, advantageously, separation of the aggregate is avoided because the slurries contain the aggregate stabilizing mixtures according to this disclosure. The amount of water to be used in these applications can be also within the ranges considered to be low-water ranges, e.g., about 150 to about 300 cc of water per 1,000 g of dry powder.

Example 1. Aggregate Stabilizing Mixtures

Aggregate Stabilizing Mixture A was prepared by mixing together dry components listed in Table A.

TABLE A

| Aggregate Stabilizing Mixture A | |
|---|---|
| Component | Amount (in pounds) |
| HYDROCAL™ C-BASE (alpha-calcined gypsum) | 46.25 |
| KELCOCRETE DIUTAN gum (polysaccharide gum) | 3.125 |
| STARVIS T-51F (polyacrylamide-gelatin blend) | 0.624 |
| Total: | 50 |

Aggregate Stabilizing Mixture B was prepared by mixing together dry components listed in Table B.

TABLE B

| Aggregate Stabilizing Mixture B | |
|---|---|
| Component | Amount (in pounds) |
| HYDROCAL™ C-BASE (alpha-calcined gypsum) | 35 |
| STARVIS™ 3090F (polysaccharide gum) | 12.50 |
| STARVIS T-51F (polyacrylamide-gelatin blend) | 0.624 |
| Total: | 50 |

Example 2. Calcium Sulfate Hemi-Hydrate/Cement Compositions

Calcium Sulfate Hemi-Hydrate/Cement Composition C was prepared by mixing together dry components listed in Table C.

TABLE C

Calcium Sulfate Hemi-Hydrate/Cement Composition C

| Component | Amount (in pounds) |
|---|---|
| PCE/FST DARK Stucco | 3,837 |
| IMP milled Class C Cement | 110 |
| VINAPOR DF 9010 (defoamer) | 2.0 |
| Aggregate Stabilizing Mixture A | 2.0 |
| Total: | 3,951 |

Calcium Sulfate Hemi-Hydrate/Cement Composition D was prepared by mixing together dry components listed in Table D.

TABLE D

Calcium Sulfate Hemi-Hydrate/Cement Composition D

| Component | Amount (in pounds) |
|---|---|
| PCE/FST DARK Stucco | 3,837 |
| IMP milled Class C Cement | 110 |
| VINAPOR DF 9010 (defoamer) | 2.0 |
| Aggregate Stabilizing Mixture B | 2.0 |
| Total: | 3,951 |

Calcium Sulfate Hemi-Hydrate/Cement Composition E was prepared by mixing together dry components listed in Table E.

TABLE E

Calcium Sulfate Hemi-Hydrate/Cement Composition E

| Component | Amount (in pounds) |
|---|---|
| PCE/FST DARK Stucco | 3,887 |
| IMP milled Class C Cement | 110 |
| VINAPOR DF 9010 (defoamer) | 2.0 |
| STARVIS T-51F | 0.10 |
| STARVIS 3090F | 0.50 |
| CSA | 0.25 |
| Total: | 3,999.85 |

Example 3. Gypsum Cement Slurries

Two gypsum cement slurries were prepared, a first gypsum slurry and a second gypsum slurry, for each of compositions C and D by mixing each of the compositions with sand at 1.9:1 (first gypsum slurry) or at 1.4:1 (second gypsum slurry) into a dry mixture. The mixtures were then mixed with water in amounts listed in table F below. The gypsum cement slurries were analyzed as reported in table F below. As a control, a gypsum cement slurry was prepared with KELCOCRETE DIUTAN gum without polyacrylate-gelatin blend. In this control gypsum cement slurry, the amount of KELCOCRETE DIUTAN gum was increased by 77% in comparison to composition C. Specifically, in the control mixture, 3 parts gypsum were used per 1 part of KELCOCRETE DIUTAN gum by weight. The control mixture was then added to a gypsum cement slurry at 0.75 pounds per one ton, or to 0.0375% by weight.

TABLE F

| | Gypsum Cement Slurries | | | | | |
|---|---|---|---|---|---|---|
| PRODUCT TESTED | 1.9:1 Sand/Comp. C | 1.4:1 Sand/Comp. C | 1.9:1 Sand/Comp. D | 1.4:1 Sand/Comp. D | 1.9:1 Sand/Control | 1.4:1 Sand/Control |
| WATER DEMAND (cc) | 170 | 172.50 | 170 | 170 | 165 | 170 |
| SLURRY DENSITY (#/ft$^3$) | 142.12 | 141.16 | 141.22 | 140.53 | 141.38 | 140.48 |
| 2" × 4" SLUMP (in) | 9.0" | 9.13" | 9.0" | 9.0" | 8.94" | 9.0" |
| DIXIE CUP VICAT SET (min) | 64 | 62 | 60 | 64 | 60 | 62 |
| 2-HOUR DENSITY (#/ft$^3$) | 132.50 | 133.06 | 133.74 | 133.05 | 134.20 | 133.73 |
| 2-HOUR STRENGTHS (psi) | 1,500 | 2,383 | 1,542 | 2,467 | 1,458 | 2,458 |
| 8-DAY DENSITY (#/ft$^3$) | 123.17 | 122.93 | 122.05 | 123.16 | 123.14 | 123.30 |
| 8-DAY STRENGTHS (psi) | 3,633 | 5,142 | 3,483 | 5,192 | 3,717 | 5,150 |
| MULTIPLIER | 2.422 | 2.157 | 2.259 | 2.104 | 2.549 | 2.095 |
| TEMPERATURE RISE | | | | | | |
| ▲T (° f.) | 26 | 28 | 26 | 29 | 27 | 31 |
| TRS (min) | 85 | 86 | 88 | 92 | 83 | 86 |
| MRR (° f./min) | 1.64 | 1.73 | 1.68 | 2.10 | 1.74 | 2.10 |
| Expansion (%) | | | | | | |
| −2-HOUR | 0.028 | 0.025 | 0.035 | 0.027 | 0.034 | 0.027 |
| 3-HOUR | 0.028 | 0.027 | 0.035 | 0.027 | 0.034 | 0.028 |
| MAX | 0.031 | 0.029 | 0.036 | 0.031 | 0.035 | 0.028 |
| 12-HOUR | 0.030 | 0.028 | 0.035 | 0.028 | 0.034 | 0.028 |
| SURFACE HARDNESS (PENNY) | 5 | 2 | 2 | 4 | 6 | 6 |

What is claimed is:

1. A composition for producing a gypsum cement slurry, the composition comprising:
   a) calcium sulfate hemi-hydrate;
   b) cement;
   c) a dispersant;
   d) a defoamer; and
   e) an aggregate stabilizing mixture, wherein the aggregate stabilizing mixture comprises:
      a polysaccharide gum in an amount from 0.001% to 0.5% by weight of the composition, and
      a polyacrylamide-gelatin blend in an amount from 0.00125% to 0.01% by weight of the composition; and
   wherein the composition is a dry mixture.

2. The composition of claim 1, wherein the composition further comprises polyethylene glycol in an amount from 0.1% to 10% by weight of the composition.

3. The composition of claim 1, wherein the polysaccharide gum includes one or more of the following: xanthan gum, welan gum and/or diutan gum.

4. The composition of claim 1, wherein the aggregate stabilizing mixture comprises alpha-calcined gypsum.

5. The composition of claim 1, wherein calcium sulfate hemi-hydrate is supplied as calcined gypsum, synthetic gypsum or any combination thereof.

6. The composition of claim 1, wherein cement is class C cement in an amount from 0.5% to 50% by weight.

7. The composition of claim 1, wherein the composition comprises at least one set retarding agent and/or at least one set accelerating agent.

8. The composition of claim 1, wherein the composition further comprises at least one aggregate.

9. The composition of claim 8, wherein the aggregate includes one or more of the following: sand, perlite, glass beads, rock, gravel, silica fume, clay, pumice, foam, vermiculite, fly ash, slag, silica fume, or any combination thereof in an amount from 100 parts by weight to 300 parts by weight of aggregate per 100 parts by weight of the composition.

10. The composition of claim 1, wherein the composition further comprises sand in an amount from 1 to 2 cubic feet of sand per 80 pounds of the composition.

11. The composition of claim 1, wherein the composition is further characterized by one or more of the following features:
   the dispersant in an amount from 0.2% to 10% by weight; and/or
   the defoamer in an amount from 0.1% to 1% by weight.

12. The composition of claim 1, wherein calcium sulfate hemi-hydrate is spray-coated with a set retarding agent.

13. A gypsum cement slurry, the gypsum cement slurry comprising:
   i) the composition of claim 1;
   ii) at least one aggregate; and
   iii) water, and
   wherein water is used in an amount from 150 cubic centimeters (cc) to 400 cubic centimeters (cc) per 1,000 grams of components i) and ii); and
   wherein the weight by weight (w/w) ratio of component ii) to component i) is in the range from 1:1 to 3:1.

14. The gypsum cement slurry of claim 13, wherein the aggregate is one or more of the following: sand, perlite, glass beads, rock, gravel, silica fume, clay, pumice, foam, vermiculite, fly ash, slag, silica fume, or any combination thereof.

15. A method of preparing a calcium sulfate hemi-hydrate/cement composition, the method comprising:
   a) mixing together an aggregate stabilizing mixture containing alpha-calcined calcium sulfate hemihydrate, a polysaccharide gum and polyacrylamide-gelatin blend; and
   b) mixing the mixture of step a) into a composition comprising at least the following components: calcined gypsum and/or synthetic gypsum, and cement, and
   wherein the aggregate stabilizing mixture is mixed in step b) in an amount resulting in the composition comprising:
      a polysaccharide gum in an amount from 0.001% to 0.5% by weight of the composition, and
      a polyacrylamide-gelatin blend in an amount from 0.00125% to 0.01% by weight of the composition.

16. The method of claim 15, wherein the aggregate stabilizing mixture contains the polysaccharide gum in an amount from 1% to 30% by weight and polyacrylamide-gelatin blend in an amount from 0.05% to 5% by weight.

17. The method of claim 15, wherein the polysaccharide gum includes one or more of the following: xanthan gum, welan gum and/or diutan gum.

18. A method for producing floor or floor underlayment, the method comprising:
   i. mixing a gypsum cement slurry from the composition of claim 1, at least one aggregate and water in a mixing vessel, wherein water is used in an amount from 150 cubic centimeters (cc) to 300 cubic centimeters (cc) per 1,000 grams of the composition and aggregate; and wherein the weight by weight (w/w) ratio of the aggregate to the composition is in the range from 1:1 to 3:1; and
   ii. applying the gypsum cement slurry to a substrate.

19. The method of claim 18, wherein the gypsum cement slurry is applied by pumping the gypsum cement slurry through a hose.

* * * * *